United States Patent
Belleschi et al.

(10) Patent No.: US 11,012,845 B2
(45) Date of Patent: May 18, 2021

(54) DEVICE-TO-DEVICE DISCOVERY COMMUNICATION

(71) Applicant: TELEFONAKTIEBOLAGET LM ERICSSON (PUBL), Stockholm (SE)

(72) Inventors: Marco Belleschi, Solna (SE); Stefano Sorrentino, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 817 days.

(21) Appl. No.: 15/230,792

(22) Filed: Aug. 8, 2016

(65) Prior Publication Data

US 2017/0048888 A1 Feb. 16, 2017

Related U.S. Application Data

(60) Provisional application No. 62/205,381, filed on Aug. 14, 2015.

(51) Int. Cl.
*H04W 8/00* (2009.01)
*H04W 76/14* (2018.01)

(52) U.S. Cl.
CPC ............ *H04W 8/005* (2013.01); *H04W 76/14* (2018.02)

(58) Field of Classification Search
CPC .............................. H04W 8/005; H04W 76/14
See application file for complete search history.

(56) References Cited

U.S. PATENT DOCUMENTS

| | | | |
|---|---|---|---|
| 2015/0043448 A1 | 2/2015 | Chatterjee et al. | |
| 2015/0215903 A1* | 7/2015 | Zhao | H04W 72/04 370/329 |
| 2015/0245193 A1* | 8/2015 | Xiong | H04W 76/14 370/328 |
| 2016/0338094 A1* | 11/2016 | Faurie | H04W 72/085 |

OTHER PUBLICATIONS

Intel Corporation: "On Overlap of Different Types of D2D Resource Pools". 3GPP TSG TAN WG1 Meeting #79. R1-144677. San Francisco, CA. Nov. 2014.

(Continued)

*Primary Examiner* — Omar J Ghowrwal

(57) ABSTRACT

According to some embodiments, a method in a wireless device of reducing collisions between device-to-device (D2D) communication resources and D2D discovery resources comprises obtaining a first plurality of transmission resources available for transmitting D2D discovery messages, and obtaining a second plurality of transmission resources comprising a subset of the first plurality. The subset comprises transmission resources potentially unavailable for transmitting D2D discovery messages. The method includes associating a first weighted value with each transmission resource of the first plurality not included in the second plurality, and associating a second weighted value with each transmission resource of the second plurality. The method includes selecting a transmission resource from the first plurality of transmission resources using the first and second weighted values, and determining whether the selected transmission resource is available to transmit a discovery message. The method includes transmitting the discovery message using the selected transmission resource.

23 Claims, 8 Drawing Sheets

(56) References Cited

OTHER PUBLICATIONS

Qualcomm Incorporated: "Out-of-Coverage discovery for Public Safety". 3GPP TSG-RAN WG2 Meeting #90. R2-152576. Fukuoka, Japan, May 2015.
Samsung: "Priority handling for D2D communication". 3GPP TSG RAN WG1 Meeting #80bis. R1-151615. Belgrade, Serbia. Apr. 2015.
Intel Corporation: "On Resource Allocation and System Operation for D2D Discovery". 3GPP TSG RAN WG1 Meeting #74bis. R1-134141. Guangzhou, China. Oct. 2013.

* cited by examiner

DEVICE-TO-DEVICE DISCOVERY COMMUNICATION

RELATED APPLICATION

This application claims benefit under 35 U.S.C. § 119(e) to U.S. Provisional Application Ser. No. 62/205,381, entitled "HANDLING COLLISIONS BETWEEN COMMUNICATION AND DISCOVERY RESOURCES," filed Aug. 14, 2015, the entire content of which is incorporated herein by reference.

TECHNICAL FIELD

Particular embodiments relate generally to wireless communications networks, and more particularly to reducing collisions between discovery resources and communication resources in device-to-device (D2D) communications, such as proximity services (ProSe).

BACKGROUND

Device-to-device (D2D) communication in the cellular spectrum enables direct wireless communication between parties in close proximity of each other, sometimes referred to as proximity services (ProSe). When a cellular network infrastructure is available it may assist user devices with D2D communication. When the cellular network infrastructure is unavailable (e.g., because of network damage, or simply because the user devices are out-of-coverage), user devices may perform D2D communication in an ad-hoc and autonomous fashion. As a particular example, in Third Generation Partnership Project (3GPP) Long Term Evolution (LTE) networks, this type of D2D communication may be referred to as LTE direct. LTE direct may be used in commercial applications, such as proximity based social networking or in public safety situations in which first responders need to communicate with each other and with victims in a disaster area [3GPP TR 22.803]. Of the number of proximity-based applications that may use D2D communications, one particular D2D communication application addresses the needs of various public safety organizations by defining a next generation of National Security and Public Safety (NSPS) standard with broadband capabilities.

D2D communication was standardized under the umbrella of 3GPP in Release 12 and enhanced D2D features are under standardization in 3GPP Release 13. 3GPP Release 12 describes two types of services: (1) Direct Communication where user equipment (UEs) in proximity of each other establish a direct user plane connection, or (2) Direct Discovery where UEs transmit in broadcast and monitor discovery announcements to learn the type of content/service each UE can share using D2D communication, and the proximity between UEs.

3GPP specifies operative mode 1 and operative mode 2 for ProSe communication. In mode 1, an RRC_CONNECTED UE requests D2D resources from an eNB and the eNB grants them via a Physical Downlink Control Channel (PDCCH) (DCI5), similar to a cellular uplink (UL) grant. In mode 2, a UE autonomously selects resources for transmission from a pool of available resources that the eNB provides in broadcast via SIB18 for transmissions on carriers other than the PCell or via dedicated signaling for transmission on the PCell.

Mode 1 provides a more accurate scheduling than mode 2. For example, the eNB can better control the resources used for ProSe communication and also reduce interference associated with resource allocation by the UE. Mode 2 is less complex to implement and uses less signaling from the eNB at the expense of a potential increase in interference associated with resource allocation by the UE. Moreover, mode 1 only applies to RRC_CONNECTED UEs, while mode 2 communications may be performed by RRC_CONNECTED or RRC_IDLE UEs.

Regardless of the mode, ProSe communication uses the Physical Sidelink Shared Channel (PSSCH) during the sidelink control (SC) period. The characteristics of the SC period (e.g., duration, SFN offset, etc.) may be signaled in broadcast by the ProSe discovery carriers. Within the SC period, each PSSCH transmission is preceded by a Scheduling Assignment (SA) period that occurs in a special Physical Sidelink Control Channel (PSCCH) channel. Transmitting UEs use PSCCH to inform other nearby UEs of characteristics associated with the following PSSCH transmission, such as physical resource blocks (PRBs), time pattern, modulation and coding scheme (MCS) parameters, etc.

3GPP also specifies two operative modes for ProSe Direct Discovery: Type 1 and Type 2B. Similar to mode 1 communication described above, in Type 2B discovery the eNB provides grants via dedicated RRC signaling. In Type 1 discovery, similar to mode 2 communication, a UE autonomously selects discovery resources. Such discovery resources are provided via dedicated signalling for UEs in the PCell that are RRC_CONNECTED, or acquired from SIB 19 for UEs that are in RRC_IDLE. More specifically, in Type 1 discovery the network provides one or more resource pools where each pool is characterized by a set of PRBs and subframes in which discovery can take place. The UE autonomously selects one of such pools either randomly or on the basis of reference signal received power (RSRP) measurements related to the different pools. Then the UE randomly selects the time/frequency resources to use within the pool, and each time/frequency resource has an equal probability of being selected.

Discovery messages are transmitted in the physical sidelink discovery channel (PSDCH) during the discovery period (SC period). The configuration of the discovery period (e.g., duration, SFN offset, etc.) is provided as part of the resource configuration. For example, the discovery period subframes that a UE can potentially use for discovery transmission (or retransmission) are signaled via a bitmap, where 0 or 1 indicates whether a specific subframe is allowed for transmission. Each pool may be configured with different bitmaps values and bitmap lengths, and can be repeated for a maximum of 5 times within the discovery period. A discovery message can be retransmitted within the pool using a different puncturing of the encoder according to the principles of soft combining.

3GPP Release 13 extends D2D discovery to UE-to-Network Relay applications. For example, a remote UE (e.g., an out-of-coverage UE) may use D2D discovery to discover a relay UE (e.g., a public safety UE) to establish a network connection.

In 3GPP Release 12, time-domain conflicts between resources selected for Type 1 ProSe discovery and ProSe communication may occur. 3GPP Release 12 specifies that in such cases ProSe communication is prioritized over discovery, and the discovery transmissions will not take place, thereby penalizing discovery performance. This behaviour might have a greater-than-negligible impact on discovery performance considering that discovery occasions typically occur on a slower time scale compared with communication. Moreover, always down-prioritizing discovery over communication might not be desirable for ProSe discovery in public safety applications (e.g., UE-to-Network relay discovery). An example of a collision is illustrated in FIG. 1.

FIG. 1 is a block diagram illustrating a time-domain collision between Type 1 discovery resources and communication resources. The horizontal axis represents the time-domain. Resource pool 5 comprises all transmission resources 10 available to a UE. Resource pool 14 comprises transmission resources 10 available to a UE for D2D discovery. Resource pools 12 include transmission resources 10 available for control and data transmission.

Discovery MAC PDUs (including potential retransmissions) are transmitted on the PSDCH according to resource pool 14, which is identified by a discovery bitmap as specified in 3GPP Release 12. In FIG. 1, at least one such MAC PDU collides with subframes selected for control or data transmission in PSCCH or PSSCH, respectively.

In the illustrated example, a UE allocates transmission resources 10b and 10d from resource pool 14 for transmitting discovery messages. The UE also allocates transmission resource 10a in resource pool 12a and transmission resource 10d in pool 12b. Transmission resources 10c and 10d collide because transmission resources 10c and 10d refer to the same time/frequency resource(s). The transmission resource may be used either for discovery or for control or data transmission, but not for both at the same time.

An eNB may alleviate the collision problem for Type 2B discovery. For example, the eNB may schedule discovery resources orthogonal to the subframe pools used for communication. Additionally, for Type 1 discovery the eNB may configure the discovery pools such that their resources do not overlap with communication resources, by configuring the discovery/SC period and the discovery/SA offset accordingly. Only a few possible configurations (e.g., setting control period and discovery period to the same value), however, completely avoid resource collisions. A problem with this solution is that it limits configuration flexibility.

SUMMARY

The embodiments described herein include methods to avoid collisions between D2D (e.g., ProSe) communication and discovery resources without adversely impacting the performance of discovery or communications. Particular embodiments may avoid selecting transmission resources to use for discovery if the transmission resource is already allocated for control or data transmission.

According to some embodiments, a method in a wireless device of reducing collisions between device-to-device (D2D) communication resources and D2D discovery resources comprises obtaining a first plurality of transmission resources. The first plurality of transmission resources comprises transmission resources available to the wireless device for transmitting D2D discovery messages. The method further comprises obtaining a second plurality of transmission resources. The second plurality of transmission resources comprises a subset of the first plurality of transmission resources. The subset comprises transmission resources potentially unavailable to the wireless device for transmitting D2D discovery messages. The method further comprises associating a first weighted value with each transmission resource of the first plurality of transmission resources not included in the second plurality of transmission resources, and associating a second weighted value with each transmission resource of the second plurality of transmission resources. The method selects, for use during a first discovery period, a first transmission resource from the first plurality of transmission resources using the first weighted value and the second weighted value and determines whether the selected first transmission resource is available to transmit a discovery message. Upon determining the selected first transmission resource is available to transmit the discovery message, the method transmits the discovery message using the selected first transmission resource.

In particular embodiments, the second plurality of transmission resources comprises transmission resources configured as control or data transmission resources. The control transmission resources may comprise Long Term Evolution (LTE) Physical Sidelink Control Channel (PSCCH) resources and data transmission resources may comprise LTE Physical Sidelink Shared Channel (PSSCH) resources. In some embodiments, the second plurality of transmission resources comprises resources scheduled for control or data transmission by the wireless device.

In particular embodiments, selecting the transmission resource from the first plurality of transmission resources may comprise excluding from selection any transmission resources associated with the second weighted value, or may comprise a pseudo-random selection of transmission resources where transmission resources associated with the first weighted value are more likely to be selected than transmission resources associated with the second weighted value. At least one of the first weighted value and the second weighted value may be determined based on a D2D traffic type.

In particular embodiments, determining whether the selected first transmission resource is available to transmit the discovery message comprises determining a D2D traffic type.

In particular embodiments, upon determining the selected first transmission resource is not available to transmit the discovery message, the method further comprises selecting, for use during the first discovery period, a second transmission resource from the first plurality of transmission resources using the first weighted value and the second weighted value. In some embodiments, the method further comprises: incrementing a failed transmission count; retaining the discovery message until a second discovery period; selecting, for use during the second discovery period, a second transmission resource from the first plurality of transmission resources using the first weighted value and the second weighted value; and determining whether the selected second transmission resource is available to transmit the retained discovery message based at least in part on the failed transmission count.

In particular embodiments, the method further comprises selecting, for use during a second discovery period, a transmission resource from the first plurality of transmission resources that corresponds to the first transmission resource selected for use during the first discovery period.

According to some embodiments, a wireless device capable of D2D communication in a wireless communication network comprises a processor, a memory, and a power source. The processor is operable to obtain a first plurality of transmission resources. The first plurality of transmission resources comprises transmission resources available to the wireless device for transmitting D2D discovery messages. The processor is further operable to obtain a second plurality of transmission resources. The second plurality of transmission resources comprises a subset of the first plurality of transmission resources. The subset comprises transmission resources potentially unavailable to the wireless device for transmitting D2D discovery messages. The processor is further operable to associate a first weighted value with each transmission resource of the first plurality of transmission resources not included in the second plurality of transmission resources, and associate a second weighted value with each transmission resource of the second plurality of transmission resources. The processor is further operable to select, for use during a first discovery period, a first transmission resource from the first plurality of transmission resources using the first weighted value and the second weighted value, and determine whether the selected first transmission resource is available to transmit a discovery message. Upon determining the selected first transmission resource is available to transmit the discovery message, the processor is operable to transmit the discovery message using the selected first transmission resource.

According to some embodiments, a wireless device wireless device capable of D2D communication in a wireless communication network comprises a receiving module, an associating module, a selecting module, a determining module, and a transmitting module. The receiving module is operable to obtain a first plurality of transmission resources. The first plurality of transmission resources comprises transmission resources available to the wireless device for transmitting D2D discovery messages. The obtaining module is further operable to obtain a second plurality of transmission resources. The second plurality of transmission resources comprises a subset of the first plurality of transmission resources. The subset comprises transmission resources potentially unavailable to the wireless device for transmitting D2D discovery messages. The associating module is operable to associate a first weighted value with each transmission resource of the first plurality of transmission resources not included in the second plurality of transmission resources, and associate a second weighted value with each transmission resource of the second plurality of transmission resources. The selecting module is operable to select, for use during a first discovery period, a first transmission resource from the first plurality of transmission resources using the first weighted value and the second weighted value. The determining module is operable to determine whether the selected first transmission resource is available to transmit a discovery message. Upon the determining modules determining that the selected first transmission resource is available to transmit the discovery message, the transmitting module is operable to transmit the discovery message using the selected first transmission resource.

According to some embodiments, a user equipment (UE) capable of D2D communication in a wireless communication network comprises an antenna configured to send and receive wireless signals. The UE further comprises radio front-end circuitry connected to the antenna and to processing circuitry. The front-end circuitry is configured to condition signals communicated between the antenna and the processing circuitry. The processing circuitry is configured to obtain a first plurality of transmission resources. The first plurality of transmission resources comprises transmission resources available to the wireless device for transmitting D2D discovery messages. The processing circuitry is further configured to obtain a second plurality of transmission resources. The second plurality of transmission resources comprises a subset of the first plurality of transmission resources. The subset comprises transmission resources potentially unavailable to the wireless device for transmitting D2D discovery messages. The processing circuitry is further configured to associate a first weighted value with each transmission resource of the first plurality of transmission resources not included in the second plurality of transmission resources, and associate a second weighted value with each transmission resource of the second plurality of transmission resources. The processing circuitry is further configured to select, for use during a first discovery period, a first transmission resource from the first plurality of transmission resources using the first weighted value and the second weighted value, and determine whether the selected first transmission resource is available to transmit a discovery message. Upon determining the selected first transmission resource is available to transmit the discovery message, the processing circuitry is configured to transmit the discovery message using the selected first transmission resource. The UE further comprises an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Also disclosed is a computer program product. The computer program product comprises instructions stored on non-transient computer-readable media which, when executed by a processor, performs the act of obtaining a first plurality of transmission resources. The first plurality of transmission resources comprises transmission resources available to the wireless device for transmitting D2D discovery messages. The instructions further perform the act of obtaining a second plurality of transmission resources. The second plurality of transmission resources comprises a subset of the first plurality of transmission resources. The subset comprises transmission resources potentially unavailable to the wireless device for transmitting D2D discovery messages. The instructions further perform the acts of associating a first weighted value with each transmission resource of the first plurality of transmission resources not included in the second plurality of transmission resources, and associating a second weighted value with each transmission resource of the second plurality of transmission resources. The instructions further perform the acts of selecting, for use during a first discovery period, a first transmission resource from the first plurality of transmission resources using the first weighted value and the second weighted value, and determining whether the selected first transmission resource is available to transmit a discovery message. Upon determining the selected first transmission resource is available to transmit the discovery message, the instructions further perform the acts of transmitting the discovery message using the selected first transmission resource.

Particular embodiments may exhibit some of the following technical advantages. Particular embodiments may reduce adverse impact on the performance of D2D discovery and communication. For example, compared to other alternatives described above, the embodiments described herein do not require changing the discovery period. As described above, changing the discovery period may increase discovery overhead and potential interference with the cellular layer. Particular embodiments do not statically prioritize discovery over communication. Static prioritization is undesirable because the types of traffic operating over ProSe communications may be delay-sensitive (e.g., VoIP). Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

In 3GPP Release 12 device-to-device (D2D) communication, time-domain conflicts between resources selected for D2D Type 1 discovery and communication may occur. When a conflict occurs, D2D communication is prioritized over discovery. Thus, the discovery message is not transmitted, which penalizes discovery performance. Always down-prioritizing discovery over communication may have an adverse effect on, for example, ProSe discovery in public safety applications (e.g., UE-to-Network relay discovery) where timely discovery is important.

Particular embodiments obviate the problems described above and include methods to avoid collisions between D2D (e.g., ProSe) communication and discovery resources without adversely impacting the performance of discovery or communications. Particular embodiments may avoid selecting transmission resources to use for discovery if the transmission resource is already allocated for control or data transmission.

Particular embodiments may reduce adverse impact on the performance of D2D discovery and communication. For example, particular embodiments do not require changing the discovery period, which could lead to increased discovery overhead and potential interference with the cellular layer. Particular embodiments do not statically prioritize discovery over communication, which might adversely affect delay-sensitive ProSe communications, such as VoIP.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 2-8 of the drawings, like numerals being used for like and corresponding parts of the various drawings. LTE is used throughout this disclosure as an example cellular system, but the ideas presented herein may apply to other wireless communication systems as well.

Figure 2:
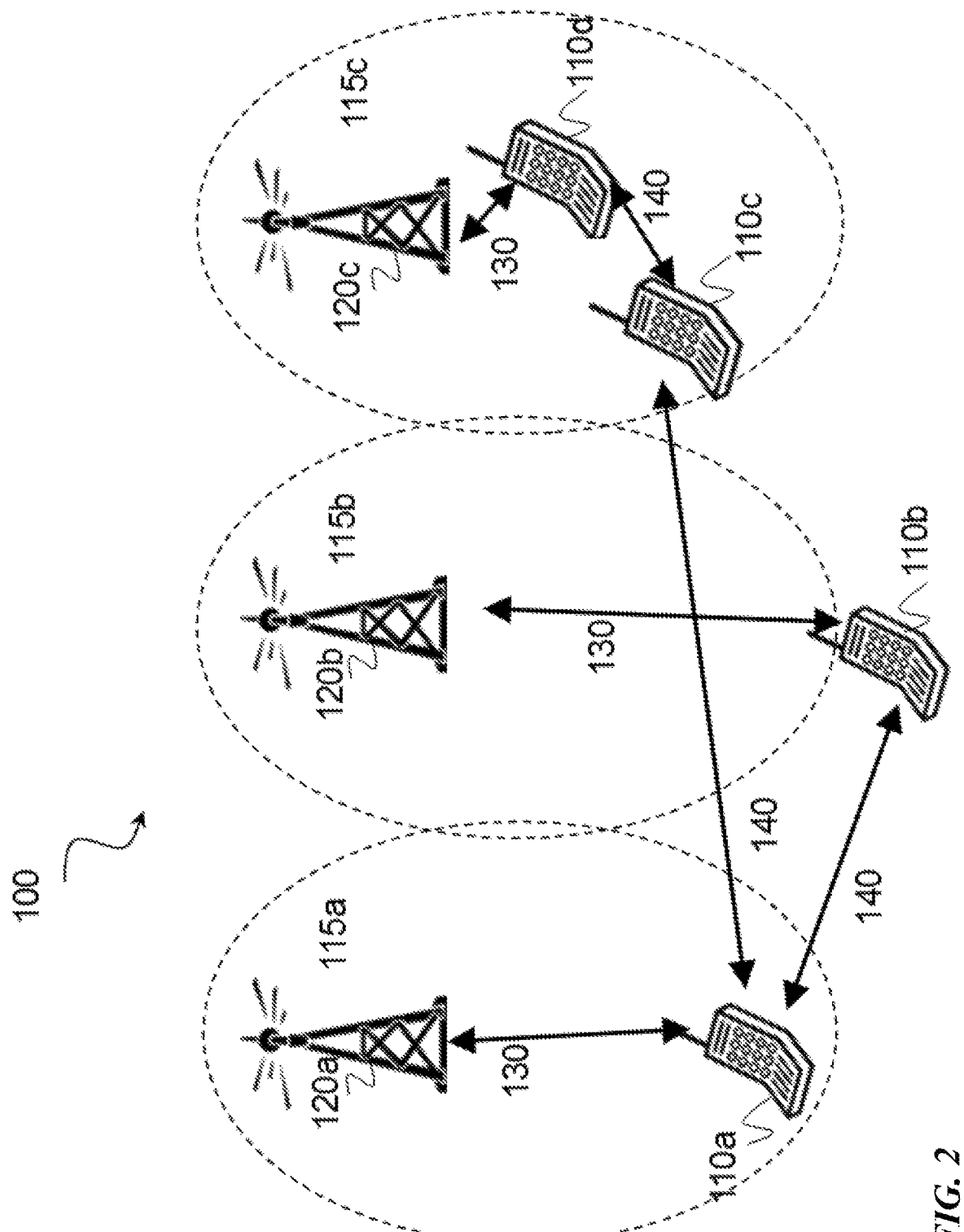
FIG. 2 is a block diagram illustrating an example wireless network, according to a particular embodiment.

FIG. 2 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Radio network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 130. For example, wireless devices 110 and radio network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from radio network node 120 to wireless devices 110) and uplink transmissions (from wireless devices 110 to radio network node 120).

Each network node 120 may have a single transmitter or multiple transmitters for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Wireless devices 110 may communicate with each other (i.e., D2D operation) by transmitting and receiving wireless signals 140. For example, wireless device 110a may communicate with wireless device 110b using wireless signal 140. Wireless signal 140 may also be referred to as sidelink 140. Communication between two wireless devices 110 may be referred to as D2D communication or sidelink communication.

In particular embodiments, wireless signal 140 may use a different carrier frequency than the carrier frequency of wireless signal 130. For example, wireless device 110a may communicate with network node 120a using a first frequency band and may communicate with wireless device 110b using the same frequency band or a second frequency band. Wireless devices 110a and 110b may be served by the same network node 120 or by different network nodes 120.

In particular embodiments, one or both of network nodes 110a and 110b may be out-of-coverage of any network node 120.

In particular embodiments, wireless devices 110 may communicate with each other using particular time and frequency resources (also referred to as transmission resources). The time and frequency resources are shared among both the D2D communications (i.e., between wireless devices 110) and the cellular communications (i.e., between wireless device 110 and network node 120). For example, particular embodiments may reserve some of the cellular uplink resources for D2D communication.

In particular embodiments, D2D transmission resources may include pooled resources. For example, particular embodiments may define a number of pools available for sending discovery, control, or data transmissions. In LTE, wireless device 110 may transmit discovery messages on a PSDCH, control messages on a PSCCH, and data on a PSSCH. To transmit data, wireless device 110 may use one or more transmission resources (e.g., time and/or frequency resources) from one of the D2D resource pools. When wireless device 110 is in communication with network node 120, wireless device 110 may receive one more pool configurations from network node 120. When wireless device 110 is out-of-coverage, wireless device 110 may rely on preconfigured D2D pools.

In particular embodiments, transmission resources may overlap between pools. For example, a discovery pool may include transmission resources that may be used for either discovery or control/data transmissions, but not both. Wireless device 110 includes logic and circuitry to reduce collisions between D2D communication resources and D2D discovery resources in wireless network 100. Wireless device 110 may associate a first weighted value with discovery transmission resources that do not overlap with control/data transmission resources and a second weighted value to the control/data transmission resources. When selecting a discovery transmission resource, wireless device 110 may use the weighted values to prioritize the selection of transmission resources so that the transmission resources without the possibility of causing a collision are selected before transmission resources that could cause a collision.

In particular embodiments, if wireless device 110 determines a collision exists between a discovery transmission resource and a control/data transmission resource, wireless device 110 may reselect another discovery transmission resource and/or reselect another control/data transmission resource. In some embodiments, wireless device 110 may abort sending a discovery message for the particular discovery period and try again in another discovery period. If another collision occurs in a subsequent discovery period for the same discovery message, wireless device 110 may give higher priority to the discovery message over the control/data transmission. Particular algorithms for assigning weights, selecting transmission resources, and resolving collisions are described in more detail with respect to FIGS. 3-6.

In wireless network 100, each radio network node 120 may use any suitable radio access technology, such as long term evolution (LTE), LTE-Advanced, UMTS, HSPA, GSM, CDMA2000, WIMAX, WIFI and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 7A below. Similarly, a network node may include any suitable combination of hardware and/or software. For example, in particular embodiments, a network node, such as network node 120, may include the components described with respect to FIG. 8 below.

Particular embodiments are described with respect to D2D discovery resource selection, but the principles described may be applied to any resource selection algorithms where resources are selected from at least partially overlapping pools. Particular embodiments may be performed according to a specification or as a proprietary resource allocation method implemented in a UE.

In conventional D2D discovery, such as 3GPP Release 12 D2D discovery, for each discovery period a UE transmits on a randomly selected discovery resource based on a transmission probability that is configured as part of each Type 1 discovery resource pool. Thus, the UE may choose any of the potential transmission resources with equal probability. In particular embodiments, a wireless device may avoid selecting transmission resources to use for D2D discovery if the transmission resource is already allocated for control or data transmission.

In particular embodiments, a wireless device pseudo-randomly selects transmission resources for discovery (PSDCH) transmission from a pool of available discovery transmission resources. The pseudo-random resource selection (both for transmission or retransmission) for discovery may exclude the subframes that are also at least partially configured for transmission and/or reception of control (PSCCH) and/or mode-2 data (PSSCH). Accordingly, the transmission resource selection probability is not uniform across all transmission resources in the pool because the transmission resources that also belong to control/data pools are selected with lower probability. In particular embodiments, the wireless device may learn of the configured pools for control/communication from the network (e.g., via pre-configuration or via signaling from the eNB). An example embodiment is illustrated in FIG. 3.

Figure 1:
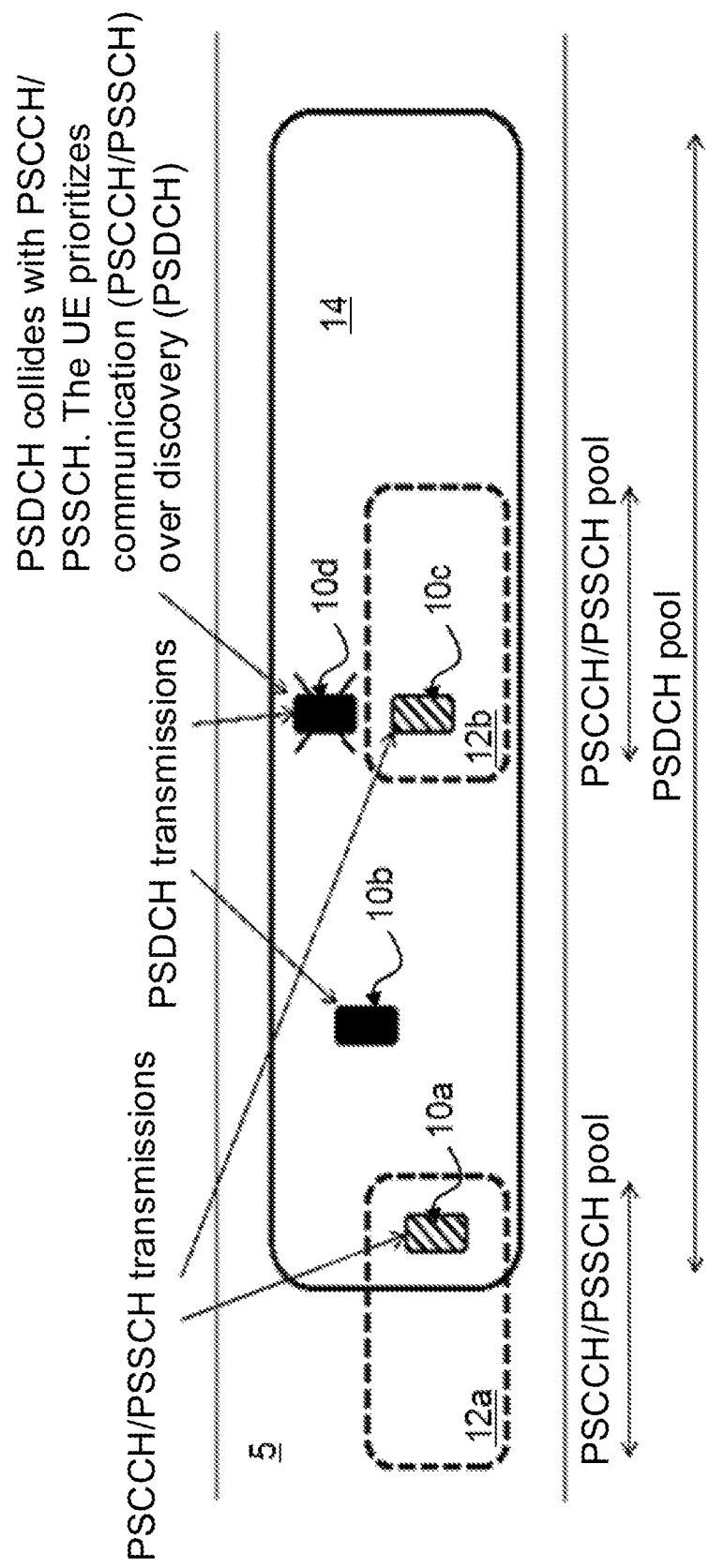
FIG. 1 is a block diagram illustrating a time-domain collision between Type 1 discovery resources and communication resources.
Figure 3:
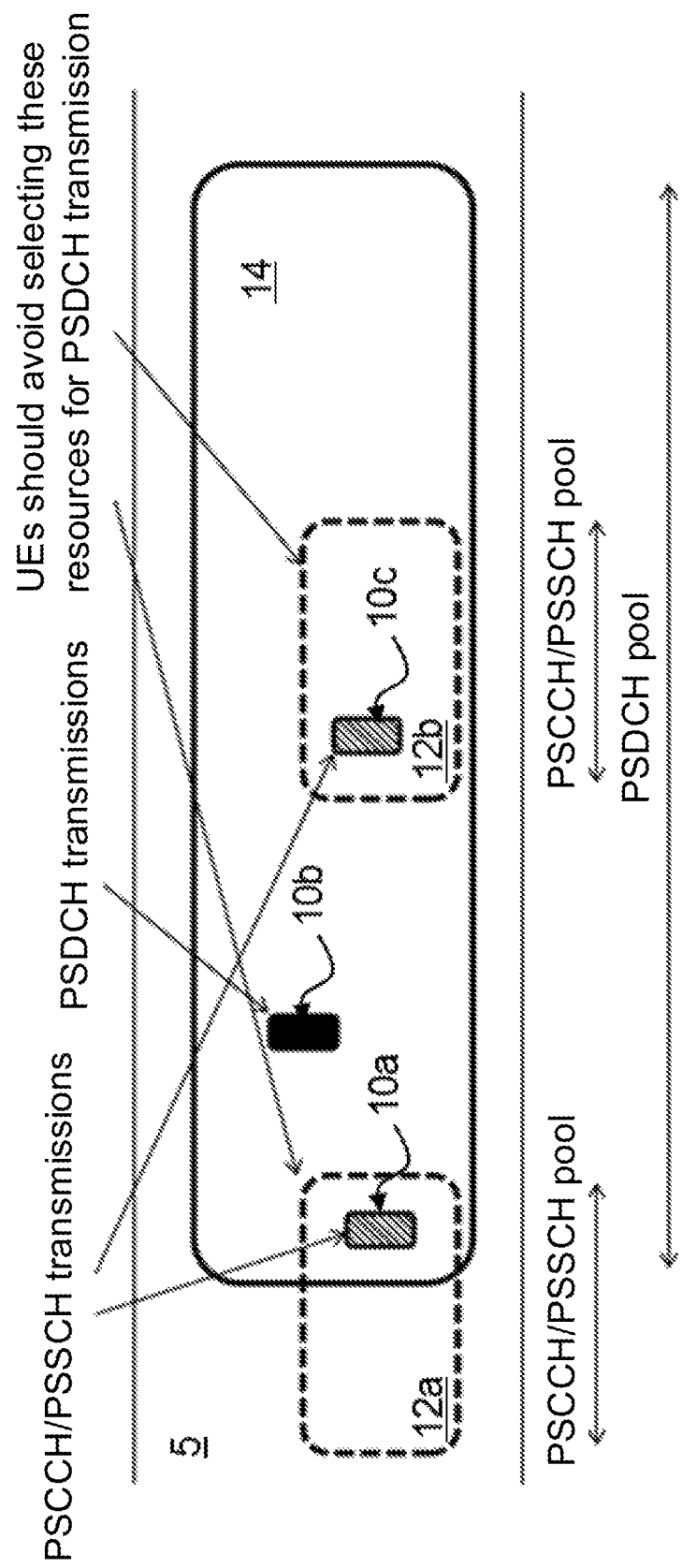
FIG. 3 is a block diagram illustrating an example allocation of Type 1 discovery resources and communication resources, according to some embodiments.

FIG. 3 is a block diagram illustrating an example allocation of Type 1 discovery resources and communication resources, according to some embodiments. The horizontal axis represents the time-domain. Similar to FIG. 1, resource pool 5 comprises all available transmission resources 10, resource pool 14 comprises transmission resources 10 available for D2D discovery, and resource pools 12 include transmission resources 10 available for control and data transmission.

In particular embodiments, a wireless device, such as wireless device 110, avoids selecting resources belonging to control/communication pools, such as transmission resource 10a in resource pool 12a or transmission resource 10c in resource pool 12b, when selecting a discovery transmission resource, such as transmission resource 10b. In particular embodiments, wireless device 110 is aware of the pools for control/communication resources (e.g., resource pools 12a and 12b) before wireless device 110 selects the PSDCH resource (e.g., transmission resource 10b) in the PSDCH pool (e.g., resource pool 14).

In particular embodiments, the wireless device does not attempt to entirely avoid the control/communication pools. Instead, the wireless device may avoid conflicts between its own PSDCH and PSCCH/PSSCH transmissions. Typically, a PSDCH transmission resource is selected before the start of the discovery pool repetition, which may span tens or even hundreds of subframes. The wireless device typically selects the control/data resources with shorter notice (i.e., typically just a few subframes in advance). Thus, a collision may occur when a wireless device selects the discovery resource and a later selected control/communication resource occurs in the same subframe.

To obviate this problem, particular embodiments may reselect the discovery resource if a collision occurs. An example is illustrated in FIG. 4.

Figure 4:
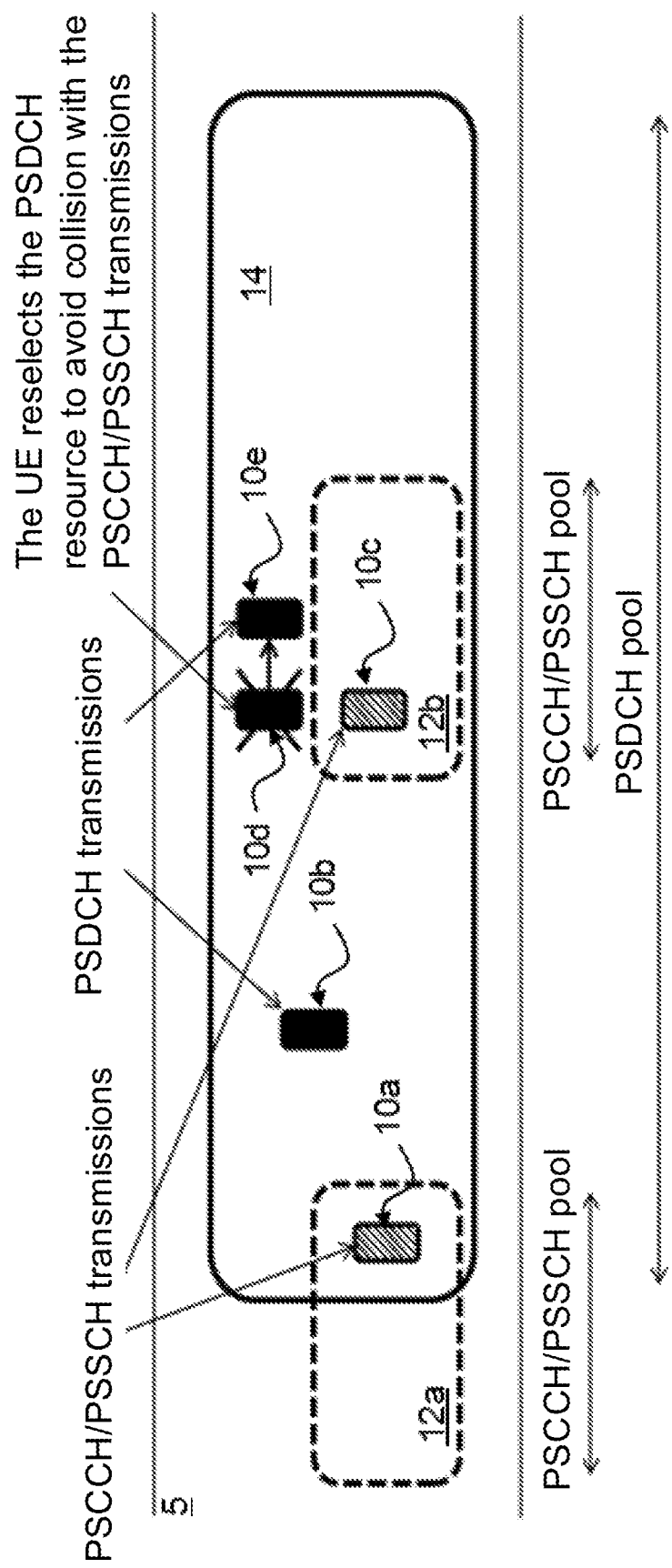
FIG. 4 is a block diagram illustrating an example allocation of Type 1 discovery resources and communication resources with reselection, according to some embodiments.

FIG. 4 is a block diagram illustrating an example allocation of Type 1 discovery resources and communication resources with reselection, according to some embodiments. The horizontal axis represents the time-domain. Similar to FIG. 1, resource pool 5 comprises all available transmission resources 10, resource pool 14 comprises transmission resources 10 available for D2D discovery, and resource pools 12 include transmission resources 10 available for control and data transmission.

In particular embodiments, a wireless device, upon selecting transmission resources for communication/control, verifies whether a collision with the selected discovery resources occurs (i.e., that transmissions are expected in the same subframe). If a collision is expected, the wireless device may perform a new discovery resource selection such that no collisions occur. The procedure may be repeated as necessary until a collision is avoided, or repeated with each new control/data transmission resource selection.

For example, wireless device 110 may select transmission resource 10d in advance for PDSCH transmission. Wireless device 110 may later select transmission resource 10c for PSCCH or PSSCH transmission. Wireless device 110 may determine that transmission resources 10d and 10c collide. In particular embodiments, wireless device 110 may select another transmission resource 10 for PDSCH transmission, such as transmission resource 10e, that does not collide with transmission resource 10c.

In particular circumstances, such as when the discovery transmission resource pool includes few transmission resources, no discovery transmission resources may be available that do not collide with control/communication transmission resources. Thus, particular embodiments may skip transmission of a discovery message for the particular discovery period. The discovery message may be retained in a ProSe buffer of the wireless device. If during the next discovery period, a further collision occurs for the discovery message, the transmission of the discovery message may be prioritized over other ProSe communication messages. In particular embodiments, the discovery message may be prioritized with a certain probability p. Probability p may increase in steps by a factor of x whenever transmission of the discovery message is aborted due to collision with control/data transmission. The probability p and the step x may be preconfigured or configured by the network.

In some embodiments, a wireless device may advance select the transmission resources that the wireless device intends to use for ProSe discovery during some number of future discovery periods (e.g., the next N discovery periods spanning the next SFN period), rather than selecting new resources at each discovery period as specified in 3GPP Release 12. Advance selection may reduce complexity and processing at the wireless device by avoiding the reselection every discovery period. Advance selection may be feasible because discovery occupies very few resources (e.g., 2 PRBs in 1 subframe for a discovery MAC PDU) and it is typically performed periodically until the wireless device is discovered or other wireless devices are discovered.

In particular embodiments, selection of communication/control transmission resources may use the same principles described above with respect to selection of discovery transmission resources. For example, to avoid collision with discovery transmission resources a wireless device may ignore resources already selected for discovery when selecting resources for communication/control transmission or assign a lower probability to resources already selected for discovery when performing a pseudo-random selection. The number of discovery periods for which the UE may perform resource selection may be configured by the network or preconfigured or configured by the ProSe function.

In particular embodiments, the resources advance selected for discovery are not selected for ProSe communication with a certain probability c that may be preconfigured or configured by the network. If a particular control/communication transmission requires a large amount of resources (i.e., few if any resources remain for discovery) and a colliding resource is selected by ProSe communication (the advance selected discovery transmission resource is selected for control/communication transmission), then the ProSe discovery transmission may be aborted in the subframe and the probability p of transmission in the next discovery period may be stepped according to the configured x.

In some embodiments, a wireless device prioritizes discovery over communication only for specific types of traffic (e.g., public safety discovery, low priority communication packets, etc.). For example, the discovery or communication transmission probabilities described in the embodiments herein may depend on the priorities of the discovery or communication messages. In some embodiments, a network node, such as an eNB, may signal the wireless device when to prioritize discovery over communication.

Figure 5:
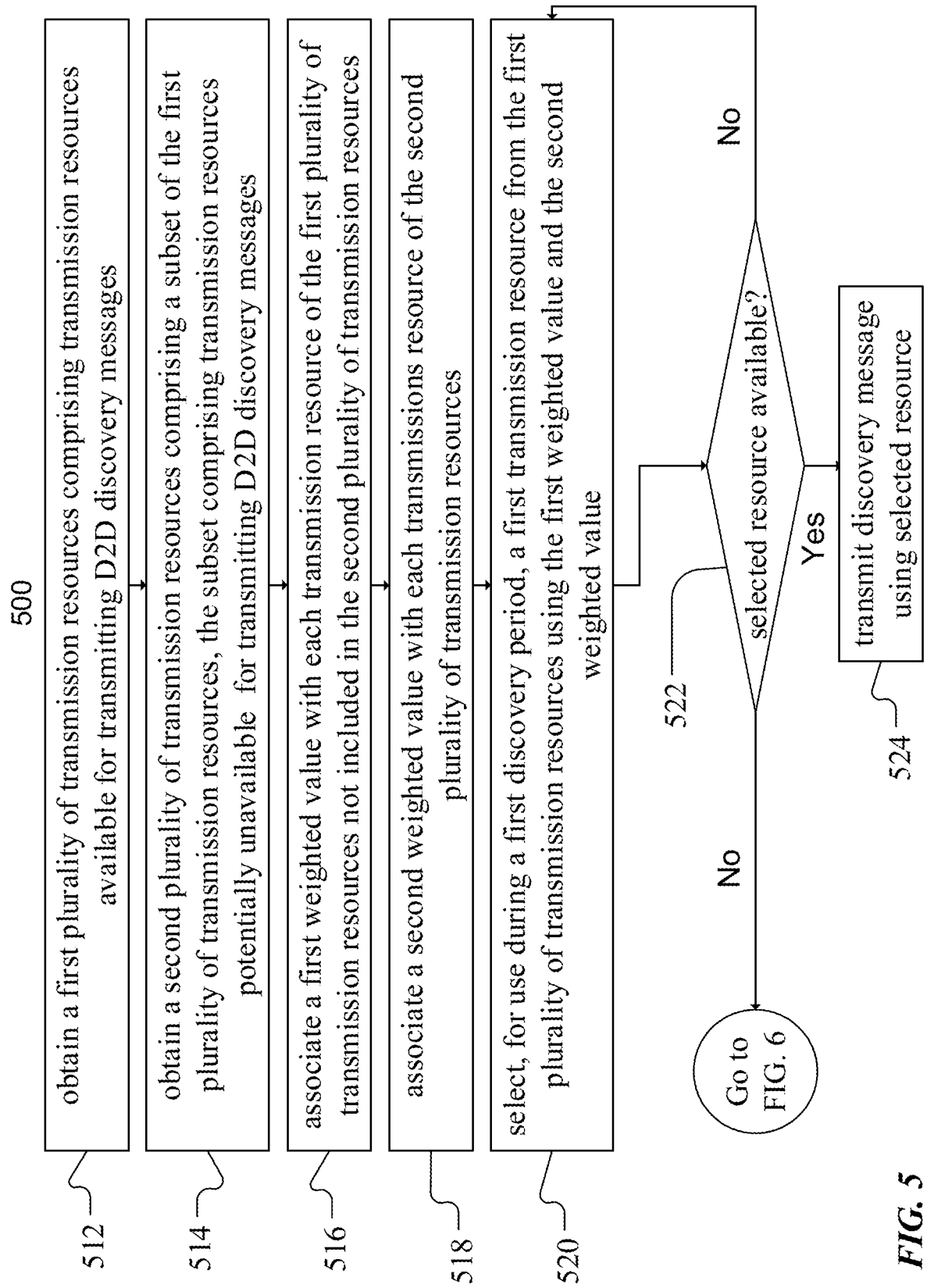
FIG. 5 is a flow diagram illustrating an example method of reducing collisions between device-to-device (D2D) communication resources and D2D discovery resources in a wireless communication network, according to some embodiments.

FIG. 5 is a flow diagram illustrating an example method of reducing collisions between device-to-device (D2D) communication resources and D2D discovery resources in a wireless communication network, according to some embodiments. In particular embodiments, one or more steps of FIG. 5 may be performed by a wireless device 110 of wireless network 100 described with respect to FIG. 2.

The method begins at step 512 where a wireless device obtains a plurality of transmission resources available for transmitting D2D discovery messages. For example, wireless device 110 may obtain resource pool 14 described with respect to FIGS. 3 and 4 for transmitting D2D discovery messages.

In particular embodiments, obtaining the transmission resources may refer to obtaining a bitmap identifying which transmission resources 10 in resource pool 5 are available for transmitting D2D discovery messages. Obtaining the bitmap (or any other suitable identification of the pool of available discovery transmission resources) may comprise receiving the bitmap from network node 120, or obtaining the bitmap may comprise wireless device 110 being preconfigured with the bitmap (or other pool identifiers).

At step 514, the wireless device obtain a second plurality of transmission resources comprising a subset of the first plurality of transmission resources, the subset comprising transmission resources potentially unavailable for transmitting D2D discovery messages. For example, wireless device 110 may obtain resource pools 12 described with respect to FIGS. 3 and 4 for D2D control/data transmissions. Particular transmission resources, such as transmission resources 10a and 10c may also be included in resource pool 14. Accordingly, resource pools 12 may include a subset of the resources in pool 14. If selected for control/data transmission, then transmission resources 10a or 10c may be unavailable for discovery transmission.

In particular embodiments, obtaining the second plurality of transmission resources may be performed in a similar manner as obtaining the first plurality of transmission resources described with respect to step 512 (e.g., identified by bitmap or some other suitable identifier, received from network node, preconfigured, etc.).

At step 516, the wireless device associates a first weighted value with each transmission resource of the first plurality of transmission resources not included in the second plurality of transmission resources. For example, wireless device 110 may associate a high priority with transmission resources 10 in pool 14 that are not also included in pools 12 (e.g., transmission resource 10b in FIGS. 3 and 4).

At step 518, the wireless device associates a second weighted value with each transmission resource of the second plurality of transmission resources. For example, wireless device 110 may associate a low priority with transmission resources 10 in pool 14 that are also included in pools 12 (e.g., transmission resource 10a and 10b in FIGS. 3 and 4).

In particular embodiments, associating a weighted value with each transmission resource may comprise explicitly assigning a value to a software data structure associated with each transmission resource individually, or assigning a value to a software data structure associated with a group of transmission resources, such as a particular pool. In some embodiments, assigning a weighted value may comprising implicitly determining a weighted value based on other attributes, such as membership in a particular pool. In some embodiments, assigning a weighted value may comprise associating a particular behavior with one or more transmission resources. For example, assigning a weighted value may comprise ignoring transmission resources in pools 12 when selecting discovery transmission resources.

In particular embodiments, a weighted value may comprise a priority (e.g., high, low, etc.), a ranking (e.g., 1-10, 1-100, etc.), a percentage (e.g., 0%, 50%, 100%, etc.), a binary value (e.g., 0 for unavailable, 1 for available), or any other suitable weighting of transmission resources with respect to each other.

In particular embodiments, assigning a weighted value may depend on a D2D traffic type. For example, if a discovery message is for a public safety application, then discovery transmission resources may be weighted more (e.g., assigned a higher priority, percentage, etc.) than control/communication transmission resources. For other traffic types, discovery transmission resources and control/communication transmission resources may be weighted equally, or weighted with any suitable distribution for the particular traffic type.

At step 520, the wireless device selects, for use during a first discovery period, a first transmission resource from the first plurality of transmission resources using the first weighted value and the second weighted value. For example, wireless device 110 may select a transmission resource 10 for discovery using a pseudo-random selection where transmission resources associated with the first weighted value (e.g., transmission resource 10b) are more likely to be selected than transmission resources associated with the second weighted value (e.g., transmission resources 10a and 10c). As another example, wireless device 110 may exclude from selection any transmission resources 10 associated with the second weighted value (e.g., always exclude transmission resources 10a and 10c). As another example, wireless device 110 may select any available transmission resource 10 associated with the first weighted value before selecting any available transmission resource 10 associated with the second weighted value. The selection of the transmission resource may occur during or prior to the first discovery period.

At step 522, the wireless device determines whether the selected first transmission resource is available to transmit a discovery message. For example, wireless device 110 may have selected transmission resource 10b illustrated in FIG. 3 in the previous step. Transmission resource 10b does not collide with any control/data transmission resources (e.g., transmission resources 10a or 10c), thus wireless device 110 may determine transmission resource 10b is available for transmitting a discovery message. A transmission resource may be considered available if the transmission resource is not allocated, selected, or reserved for some other transmission.

As another example, wireless device 110 may have selected transmission resource 10d illustrated in FIG. 4 in the previous step. If the same resource is selected for control/data transmission (i.e., transmission resource 10c in FIG. 4), then wireless device 110 may determine that transmission resource 10d is not available for transmitting a discovery message.

In particular embodiments, the wireless device may determine the selected transmission resource is available to transmit a discovery message even if the same resource is selected for a control/data transmission. For example, based on a particular D2D traffic type (e.g., public safety application, etc.), wireless device 110 may determine that transmission resource 10d should be used to transmit a discovery message and preempt the control/data transmission scheduled for the same resource (i.e., transmission resource 10c).

If the wireless device determines the selected transmission resource is available (e.g., transmission resource 10b in FIG. 3), then the wireless device continues to step 524 where the wireless device transmits the discovery message using the selected resource. If the wireless device determines the selected transmission resource is not available (e.g., transmission resource 10d in FIG. 4), then the wireless device may return to step 520 and select another transmission resource, or the wireless device may continue to step 612 described below with respect to FIG. 6. In some embodiments, the wireless device may return to step 520 for some threshold number of times and then continue to step 612 if the selected transmission resource continues to be unavailable.

Modifications, additions, or omissions may be made to method 500. Additionally, one or more steps in method 500 of FIG. 5 may be performed in parallel or in any suitable order.

Figure 6:
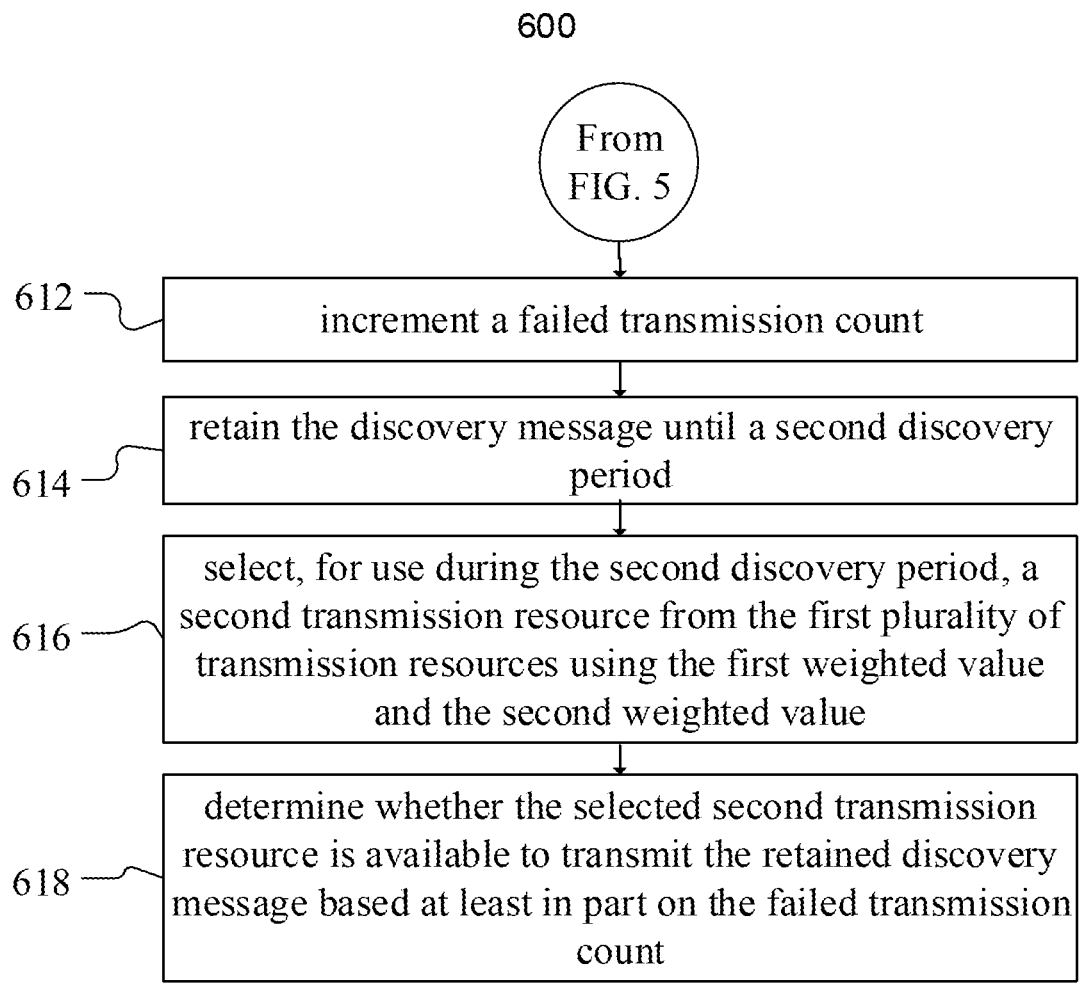
FIG. 6 is a flow diagram illustrating an example method of resolving collisions between device-to-device (D2D) communication resources and D2D discovery resources in a wireless communication network, according to some embodiments.

FIG. 6 is a flow diagram illustrating an example method of resolving collisions between device-to-device (D2D) communication resources and D2D discovery resources in a wireless communication network, according to some embodiments. In particular embodiments, one or more steps of FIG. 6 may be performed by a wireless device 110 of wireless network 100 described with respect to FIG. 2.

The method begins at step 612, where a wireless device increments a failed transmission count. For example, wireless device 110 may have determined at step 522 in FIG. 5 that the selected transmission resource was unavailable to send a discovery message (i.e., collision occurs). Wireless device 110 may determine not to send the discovery message during the current discovery period and instead to try again in a future discovery period. To keep track of the number of failed transmission attempts, wireless device 110 increments a counter.

In particular embodiments, incrementing the counter may comprise incrementing a software variable, or may comprise any other suitable tracking of failed attempts from one discovery period to another. In particular embodiments, incrementing the counter may include incrementing a transmission priority value by some step value. For example, a transmission priority value may start at 0 and the wireless device may increment the value by 5 for every failed transmission attempt.

At step 614, the wireless device retains the discovery message until a second discovery period. For example, wireless device 110 may buffer the discovery message until the next discovery period, or any subsequent discovery period.

At step 616, the wireless device selects, for use during the second discovery period, a second transmission resource from the first plurality of transmission resources using the first weighted value and the second weighted value. For example, wireless device 110 may select a transmission resource according to any of the methods described with respect to step 520 of FIG. 5. The transmission resource may be selected during or prior to the second discovery period.

At step 618, the wireless device determines whether the selected second transmission resource is available to transmit the retained discovery message based at least in part on the failed transmission count. For example wireless device 110 may initially determine whether the selected transmission resource is available for transmission similar to step 522 of FIG. 5. If the transmission resource is initially determined not to be available, then wireless device 110 may consider the failed transmission count. If the failed transmission count is 0, then wireless device 110 may abort the discovery message and return to step 612. If the failed transmission count is above some threshold, then wireless device 110 may preempt a control/data transmission and transmit the discovery message.

Modifications, additions, or omissions may be made to method 600. Additionally, one or more steps in method 600 of FIG. 6 may be performed in parallel or in any suitable order.

One or more steps of methods 500 and 600 may be repeated as necessary over time. For example, in some embodiments methods 500 and/or 600 may be repeated each discovery period. In some embodiments, methods 500 and/or 600 may select a transmission resource for use in a first discovery period, and the corresponding transmission resource may be used for discovery transmission in one or more subsequent discovery periods without performing the steps of methods 500 and/or 600.

For example, prior to or during a first discovery period wireless device 110 may select transmission resource 10*b* for transmitting a discovery message. Transmission resource 10*b* refers to particular time and frequency resources in relation to the discovery period. In subsequent discovery periods, wireless device 110 may use the same time and frequency resources (i.e., the time and frequency resources corresponding to transmission resource 10*b* in relation to the subsequent time period) for transmitting a discovery message without performing the selecting steps over again.

Particular embodiments are described with respect to D2D discovery resource selection, but the principles described may be applied to any resource selection algorithms where resources are selected from at least partially overlapping pools. For example, obtaining a first plurality of transmission resources may simply comprise obtaining a first plurality of resources for a first content type, and obtaining a second plurality of transmission resources may comprise obtaining a plurality of transmission resources for a second content type that overlap with the first plurality. Weighted values may be assigned to members of the first plurality and the second plurality based on a relationship between the first content type and the second content type (e.g., a priority associated with each type).

Figure 7A:
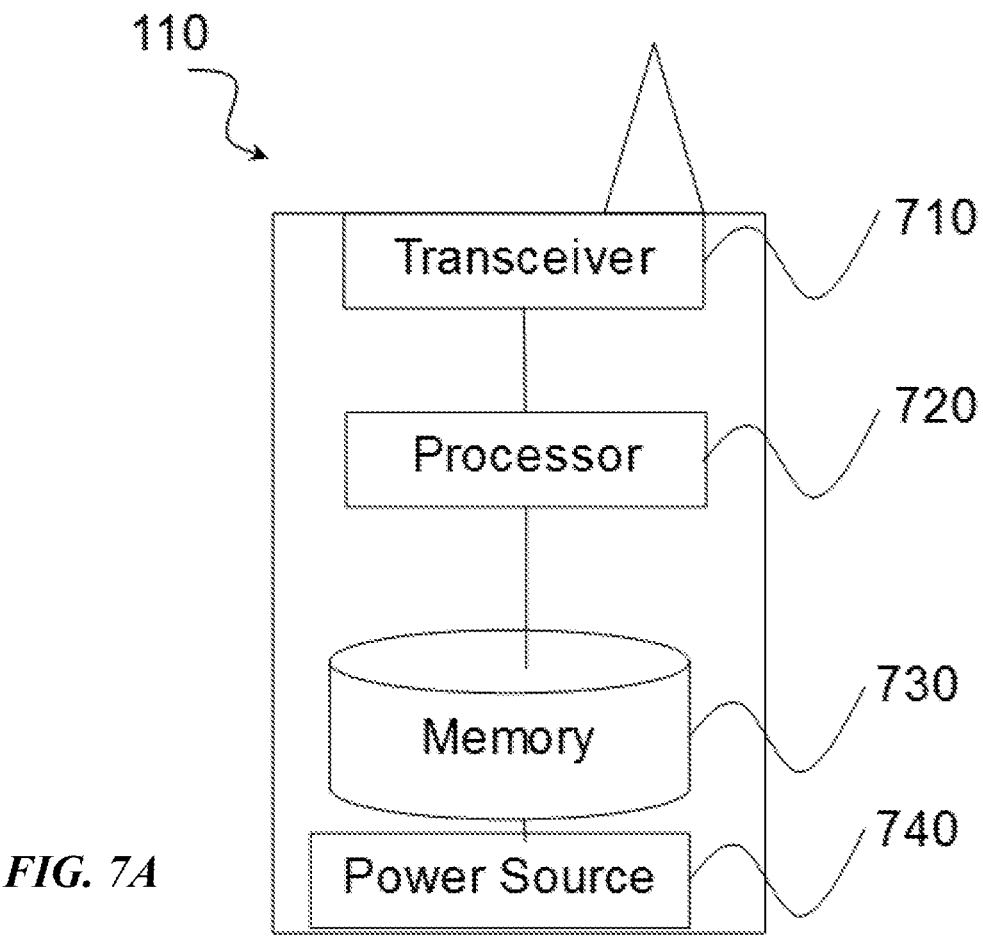
FIG. 7A is a block diagram illustrating an example embodiment of a wireless device.

FIG. 7A is a block diagram illustrating an example embodiment of a wireless device. The wireless device is an example of the wireless devices 110 illustrated in FIG. 2. The wireless device is capable of obtaining a plurality of transmission resources available for D2D discovery and a plurality of transmission resources available for D2D communications (e.g., identifying a set of time and frequency resources that belong to a discovery pool and/or to a control/data pool). The wireless device may associate weighted values with the transmission resources and use the weighted values to select particular transmission resources over others. For example, the wireless device may prioritize selection discovery transmission resources that do not overlap with control/data transmission resources. If a collision does occur, the wireless device may perform reselection and/or retransmission to avoid the collision.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 710, processor 720, memory 730, and power supply 740. In some embodiments, transceiver 710 facilitates transmitting wireless signals to and receiving wireless signals from wireless network node 120 (e.g., via an antenna), processor 720 executes instructions to provide some or all of the functionality described herein as provided by the wireless device, and memory 730 stores the instructions executed by processor 720. Power supply 740 supplies electrical power to one or more of the components of wireless device 110, such as transceiver 710, processor 720, and/or memory 730.

Processor 720 includes any suitable combination of hardware and software implemented in one or more integrated circuits or modules to execute instructions and manipulate data to perform some or all of the described functions of the wireless device. In some embodiments, processor 720 may include, for example, one or more computers, one more programmable logic devices, one or more central processing units (CPUs), one or more microprocessors, one or more applications, and/or other logic, and/or any suitable combination of the preceding. Processor 720 may include analog and/or digital circuitry configured to perform some or all of the described functions of wireless device 110. For example, processor 720 may include resistors, capacitors, inductors, transistors, diodes, and/or any other suitable circuit components.

Memory 730 is generally operable to store computer executable code and data. Examples of memory 730 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power supply 740 is generally operable to supply electrical power to the components of wireless device 110. Power supply 740 may include any suitable type of battery, such as lithium-ion, lithium-air, lithium polymer, nickel cadmium, nickel metal hydride, or any other suitable type of battery for supplying power to a wireless device.

In particular embodiments, processor 720 in communication with transceiver 710 obtains a plurality of transmission resources available for D2D discovery and a plurality of transmission resources available for D2D communications; associates weighted values with the transmission resources; selects particular discovery and/or control/data transmission resources based on the weighted values; and transmits discovery messages to other wireless devices 110.

Other embodiments of the wireless device may include additional components (beyond those shown in FIG. 7A) responsible for providing certain aspects of the wireless device's functionality, including any of the functionality described above and/or any additional functionality (including any functionality necessary to support the solution described above).

Figure 7B:
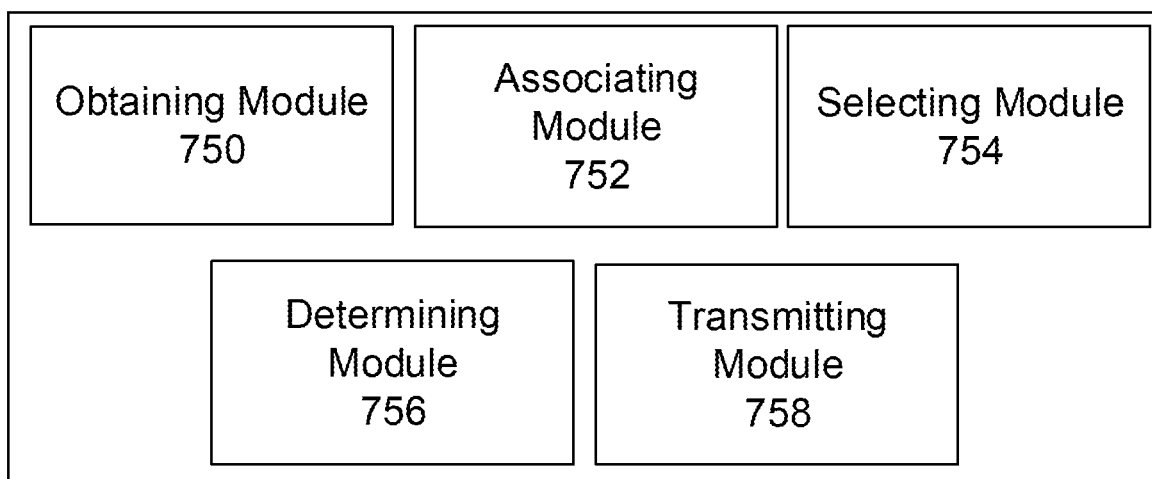
FIG. 7B is a block diagram illustrating example components of a wireless device.

FIG. 7B is a block diagram illustrating example components of a wireless device 110. The components may include obtaining module 750, associating module 752, selecting module 754, determining module 756, and transmitting module 758.

Obtaining module 750 may perform the obtaining functions of wireless device 110. For example, obtaining module 750 may obtain a first plurality of transmission resources comprising transmission resources available to the wireless device for transmitting D2D discovery messages and obtain a second plurality of transmission resources comprising a subset of the first plurality of transmission resources, the subset comprising transmission resources potentially unavailable to the wireless device for transmitting D2D discovery messages. In certain embodiments, obtaining module 750 may include or be included in processor 720. In particular embodiments, obtaining module 750 may communicate with associating module 752, selecting module 754, determining module 756, and transmitting module 758.

Associating module 752 may perform the associating functions of wireless device 110. For example, associating module 752 may associating a first weighted value with each discovery transmission resource not included in the plurality of transmission resources used for control/data transmission and associate a second weighted value with each transmission resource that could potentially be used for both discovery and control/data transmissions. In certain embodiments, associating module 752 may include or be included in processor 720. In particular embodiments, associating module 752 may communicate with obtaining module 750, selecting module 754, determining module 756, and transmitting module 758.

Selecting module 754 may perform the selecting functions of wireless device 110. For example, selecting module 754 may select transmission resources for discovery and/or control/data transmissions. In certain embodiments, selecting module 754 may include or be included in processor 720. In particular embodiments, selecting module 754 may communicate with obtaining module 750, associating module 752, determining module 756, and transmitting module 758.

Determining module 756 may perform the determining functions of wireless device 110. For example, determining module 756 may determine whether a selected transmission resource is available to transmit a discovery message. In certain embodiments, determining module 756 may include or be included in processor 720. In particular embodiments, determining module 756 may communicate with obtaining module 750, associating module 752, selecting module 754, and transmitting module 758.

Transmitting module 758 may perform the transmitting functions of wireless device 110. For example, transmitting module 758 may transmit communications, such as discovery and/or control/data transmission, to wireless device 110. In certain embodiments, transmitting module 758 may include or be included in processor 720. Transmitting module 758 may include circuitry configured to transmit radio signals. In particular embodiments, transmitting module 758 may communicate with obtaining module 750, associating module 752, selecting module 754, and determining module 756.

Figure 8:
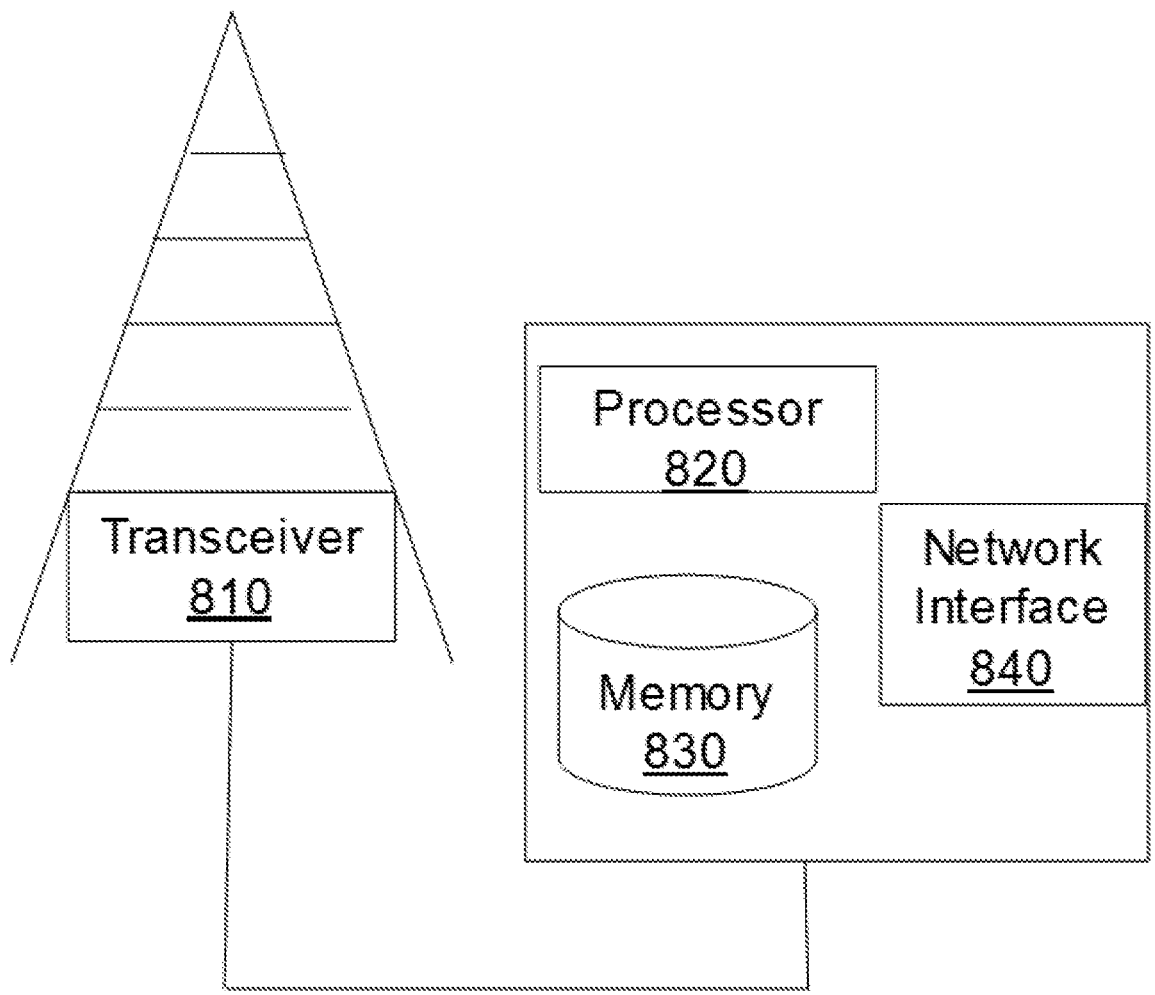
FIG. 8 is a block diagram illustrating an example embodiment of a network node.

FIG. 8 is a block diagram illustrating an example embodiment of a network node. The network node is an example of the network node 120 illustrated in FIG. 2. The network node is capable of determining a division of a set of resources allocated for D2D communication into a plurality of regions. Each region of the plurality of regions is associated with a priority level, and the set of resources comprises a plurality of resource pools. The network node is capable of communicating the division of the set of resources allocated for D2D communication to a wireless device.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes at least one transceiver 810, at least one processor 820, at least one memory 830, and at least one network interface 840. Transceiver 810 facilitates transmitting wireless signals to and receiving wireless signals from a wireless device, such as wireless devices 110 (e.g., via an antenna); processor 820 executes instructions to provide some or all of the functionality described above as being provided by a network node 120; memory 830 stores the instructions executed by processor 820; and network interface 840 communicates signals to backend network components, such as a gateway, switch, router, Internet, Public Switched Telephone Network (PSTN), controller, and/or other network nodes 120. Processor 820 and memory 830 can be of the same types as described with respect to processor 720 and memory 730 of FIG. 7A above.

In some embodiments, network interface 840 is communicatively coupled to processor 820 and refers to any suitable device operable to receive input for network node 120, send output from network node 120, perform suitable processing of the input or output or both, communicate to other devices, or any combination of the preceding. Network interface 840 includes appropriate hardware (e.g., port, modem, network interface card, etc.) and software, including protocol conversion and data processing capabilities, to communicate through a network.

In particular embodiments, processor 820 in communication with transceiver 810 determines a division of a set of resources allocated for D2D communication into a plurality of regions, and communicates the division of the set of resources allocated for D2D communication to a wireless device.

Other embodiments of network node 120 include additional components (beyond those shown in FIG. 8) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Some embodiments of the disclosure may provide one or more technical advantages. As an example, particular embodiments may reduce adverse impact on the performance of D2D discovery and communication. For example, the embodiments described herein reduce collisions between discovery and control/data transmission resources without changing the discovery period. A drawback of changing the discovery period is that it may increase discovery overhead and potential interference with the cellular layer. Particular embodiments do not statically prioritize discovery over communication. Static prioritization is undesirable because the types of traffic operating over ProSe communications may be delay-sensitive (e.g., VoIP). Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BSR Buffer Status Report
BTS Base Transceiver Station
D2D Device to Device
DRX Discontinuous Reception
eNB eNodeB
LTE Long Term Evolution
MAC Medium Access Layer
M2M Machine to Machine
MCS Modulation and Coding Scheme
MIMO Multi-Input Multi-Output
MTC Machine Type Communication
NSPS National Security and Public Safety
PCell Primary Cell
PDU Packet Data Unit
PRB Physical Resource Block
ProSe Proximity Services
PSCCH Physical Sidelink Control Channel
PSDCH Physical Sidelink Discovery Channel
PSSCH Physical Sidelink Channel
PTT Push-To-Talk
RAN Radio Access Network
RAT Radio Access Technology
RRC Radio Resource Control
RRH Remote Radio Head
RRU Remote Radio Unit
RSRP Reference Signal Received Power
SA Scheduling assignment
SC Sidelink Control
SFN System Frame Number
SIB System Information Block
UE User Equipment
VoIP Voice Over IP
WAN Wireless Access Network

The invention claimed is:

1. A method in a wireless device of reducing collisions between device-to-device (D2D) communication resources and D2D discovery resources in a wireless communication network, the method comprising:
obtaining a first plurality of transmission resources, the first plurality of transmission resources comprising transmission resources available to the wireless device for transmitting D2D discovery messages;
obtaining a second plurality of transmission resources, the second plurality of transmission resources comprising a subset of the first plurality of transmission resources, the subset comprising transmission resources potentially unavailable to the wireless device for transmitting D2D discovery messages;
associating a first weighted value with each transmission resource of the first plurality of transmission resources not included in the second plurality of transmission resources;
associating a second weighted value with each transmission resource of the second plurality of transmission resources;
selecting, for use during a first discovery period, a first transmission resource from the first plurality of transmission resources using the first weighted value and the second weighted value;
determining whether the selected first transmission resource is available to transmit a discovery message; and
upon determining the selected first transmission resource is available to transmit the discovery message, transmitting the discovery message using the selected first transmission resource.

2. The method of claim 1, wherein selecting the transmission resource from the first plurality of transmission resources comprises excluding from selection any transmission resources associated with the second weighted value.

3. The method of claim 1, wherein selecting the transmission resource from the first plurality of transmission resources comprises a pseudo-random selection of transmission resources where transmission resources associated with the first weighted value are more likely to be selected than transmission resources associated with the second weighted value.

4. The method of claim 1, wherein at least one of the first weighted value and the second weighted value are determined based on a D2D traffic type.

5. The method of claim 1, wherein determining whether the selected first transmission resource is available to transmit the discovery message comprises determining a D2D traffic type.

6. The method of claim 1, wherein the second plurality of transmission resources comprises transmission resources configured as control or data transmission resources.

7. The method of claim 6, wherein control transmission resources comprise Long Term Evolution (LTE) Physical Sidelink Control Channel (PSCCH) resources and data transmission resources comprise LTE Physical Sidelink Shared Channel (PSSCH) resources.

8. The method of claim 1, wherein the second plurality of transmission resources comprises resources scheduled for control or data transmission by the wireless device.

9. The method of claim 1, wherein upon determining the selected first transmission resource is not available to transmit the discovery message, the method further comprises selecting, for use during the first discovery period, a second transmission resource from the first plurality of transmission resources using the first weighted value and the second weighted value.

10. The method of claim 1, wherein upon determining the selected first transmission resource is not available to transmit the discovery message, the method further comprises:
incrementing a failed transmission count;
retaining the discovery message until a second discovery period;
selecting, for use during the second discovery period, a second transmission resource from the first plurality of transmission resources using the first weighted value and the second weighted value; and
determining whether the selected second transmission resource is available to transmit the retained discovery message based at least in part on the failed transmission count.

11. The method of claim 1, further comprising selecting, for use during a second discovery period, a transmission resource from the first plurality of transmission resources that corresponds to the first transmission resource selected for use during the first discovery period.

12. A wireless device capable of device-to-device (D2D) communication in a wireless communication network, the wireless device comprising a processor, a memory, and a power source, the processor operable to:
obtain a first plurality of transmission resources, the first plurality of transmission resources comprising transmission resources available to the wireless device for transmitting D2D discovery messages;
obtain a second plurality of transmission resources, the second plurality of transmission resources comprising a subset of the first plurality of transmission resources, the subset comprising transmission resources potentially unavailable to the wireless device for transmitting D2D discovery messages;
associate a first weighted value with each transmission resource of the first plurality of transmission resources not included in the second plurality of transmission resources;
associate a second weighted value with each transmission resource of the second plurality of transmission resources;
select, for use during a first discovery period, a first transmission resource from the first plurality of transmission resources using the first weighted value and the second weighted value;
determine whether the selected first transmission resource is available to transmit a discovery message; and
upon determining the selected first transmission resource is available to transmit the discovery message, transmit the discovery message using the selected first transmission resource.

13. The wireless device of claim 12, wherein the processor is operable to select the transmission resource from the first plurality of transmission resources by excluding from selection any transmission resources associated with the second weighted value.

14. The wireless device of claim 12, wherein the processor is operable to select the transmission resource from the first plurality of transmission resources by performing a pseudo-random selection of transmission resources where transmission resources associated with the first weighted value are more likely to be selected than transmission resources associated with the second weighted value.

15. The wireless device of claim 12, wherein at least one of the first weighted value and the second weighted value are determined based on a D2D traffic type.

16. The wireless device of claim 12, wherein the processor operable to determine whether the selected first transmission resource is available to transmit the discovery message is operable to determine a D2D traffic type.

17. The wireless device of claim 12, wherein the second plurality of transmission resources comprises transmission resources configured as control or data transmission resources.

18. The wireless device of claim 17, wherein control transmission resources comprise Long Term Evolution (LTE) Physical Sidelink Control Channel (PSCCH) resources and data transmission resources comprise LTE Physical Sidelink Shared Channel (PSSCH) resources.

19. The wireless device of claim 12, wherein the second plurality of transmission resources comprises resources scheduled for control or data transmission by the wireless device.

20. The wireless device of claim 12, wherein the processor, upon determining the selected first transmission resource is not available to transmit the discovery message, is operable to select, for use during the first discovery period, a second transmission resource from the first plurality of transmission resources using the first weighted value and the second weighted value.

21. The wireless device of claim 12, wherein the processor, upon determining the selected first transmission resource is not available to transmit the discovery message, is operable to:
increment a failed transmission count;
retain the discovery message until a second discovery period;
select, for use during the second discovery period, a second transmission resource from the first plurality of transmission resources using the first weighted value and the second weighted value; and
determine whether the selected second transmission resource is available to transmit the retained discovery message based at least in part on the failed transmission count.

22. The wireless device of claim 12, the processor further operable to select, for use during a second discovery period, a transmission resource from the first plurality of transmission resources that corresponds to the first transmission resource selected for use during the first discovery period.

23. A user equipment (UE) capable of device-to-device (D2D) communication in a wireless communication network, the UE comprising:
an antenna configured to send and receive wireless signals;
radio front-end circuitry connected to the antenna and to processing circuitry, and configured to condition signals communicated between the antenna and the processing circuitry;
the processing circuitry being configured to:
obtain a first plurality of transmission resources, the first plurality of transmission resources comprising transmission resources available to the wireless device for transmitting D2D discovery messages;
obtain a second plurality of transmission resources, the second plurality of transmission resources comprising a subset of the first plurality of transmission resources, the subset comprising transmission resources potentially unavailable to the wireless device for transmitting D2D discovery messages;
associate a first weighted value with each transmission resource of the first plurality of transmission resources not included in the second plurality of transmission resources;
associate a second weighted value with each transmission resource of the second plurality of transmission resources;
select, for use during a first discovery period, a first transmission resource from the first plurality of transmission resources using the first weighted value and the second weighted value;
determine whether the selected first transmission resource is available to transmit a discovery message; and
upon determining the selected first transmission resource is available to transmit the discovery message, transmit the discovery message using the selected first transmission resource;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

* * * * *